April 8, 1941.                    A. J. RHODES                    2,237,843
                          ADJUSTABLE SUPPORTING DEVICE
                           Filed Aug. 15, 1938         2 Sheets-Sheet 1
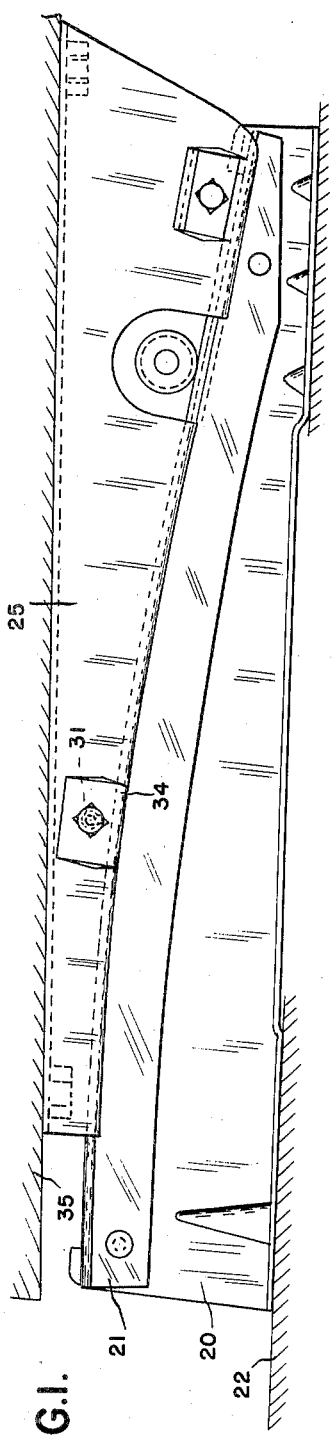
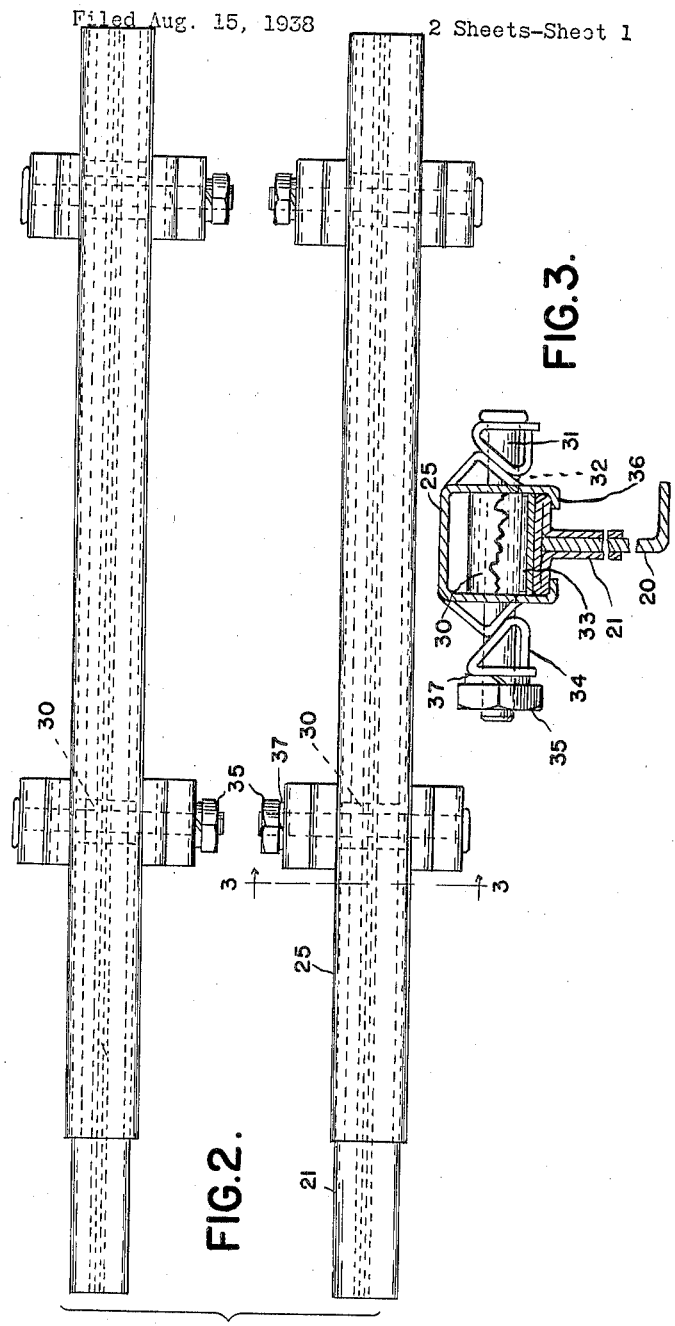
INVENTOR.
ALBERT J. RHODES
BY
ATTORNEYS April 8, 1941.    A. J. RHODES    2,237,843
ADJUSTABLE SUPPORTING DEVICE
Filed Aug. 15, 1938    2 Sheets-Sheet 2
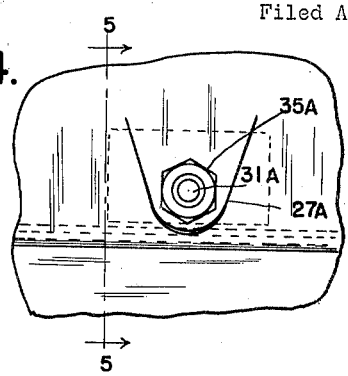
FIG.4.
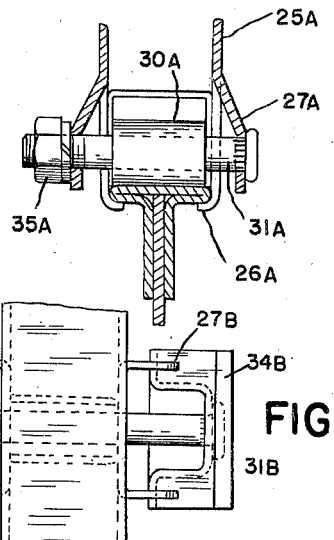
FIG.5.
FIG.8.
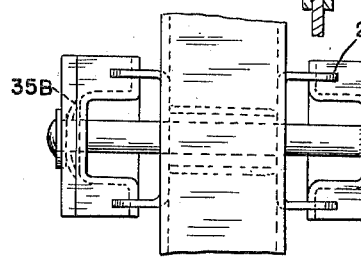
FIG.6.
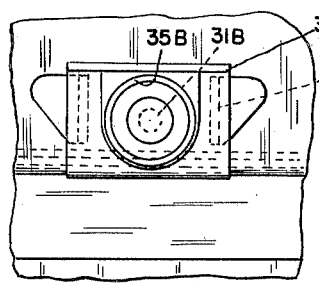
FIG.7.
FIG.11.
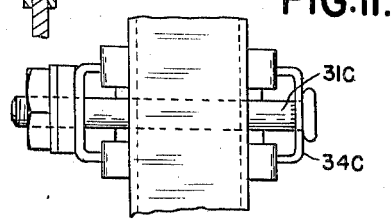
FIG.9.
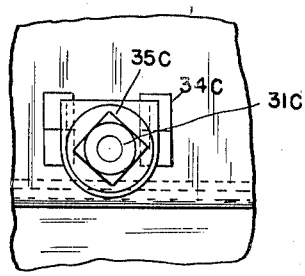
FIG.10.
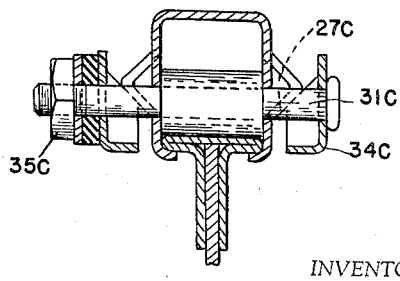
INVENTOR.
ALBERT J. RHODES
BY
Swan, Nye Hardesty
ATTORNEYS Patented Apr. 8, 1941

2,237,843

UNITED STATES PATENT OFFICE 2,237,843

ADJUSTABLE SUPPORTING DEVICE

Albert J. Rhodes, Lake Orion, Mich., assignor to American Forging & Socket Company, Pontaic, Mich., a corporation of Michigan Application August 15, 1938, Serial No. 224,929

5 Claims. (Cl. 155—14)

This invention relates to improvements in adjustable supporting devices, particularly for the seats of vehicles, and aims to provide improved means whereby a seat (or other object) may be rollably supported, upon tracks or the like, and freely movable when desired, to adjust its position, yet normally rigidly held in any selected location.

Another object of the invention is to provide seat supporting means of the character indicated incorporating improved take-up means which is readily adjustable either manually or automatically to change the frictional resistance of the parts to rolling movement, and to enable clamping the parts tightly together. A related object is to provide such take-up means which prevents rattling and lost motion between all parts of the mechanism.

Other objects and advantages will be apparent from the following description, wherein reference is made to the accompanying drawings illustrating a preferred embodiment of the invention and wherein similar reference numerals designate similar parts throughout the several views.

In the drawings:

Figure 1 is a side elevational view of a seat supporting assembly constructed in accordance with the present invention.

Figure 2 is a plan view thereof.

Figure 3 is a cross section taken substantially on the line 3—3 of Figure 2 and looking in the direction of the arrows.

Figure 4 is a fragmentary side elevational view of a seat support incorporating somewhat modified friction adjustment means.

Figure 5 is a sectional view thereof similar to Figure 3 taken substantially as indicated by the line and arrows 5—5 of Figure 4.

Figures 6, 7 and 8 are fragmentary side elevational, sectional, and plan views, respectively, showing take-up means of another modified construction as incorporated in a similar seat support, and Figures 9, 10 and 11 are similar side elevational, cross sectional and plan views of still another modified friction take-up means.

Referring now to the drawings, reference character 20 designates a supporting track, adapted to be attached to a floor as 22, and carrying at its top a rigidly attached rail head portion 21, of T-section, over which a carriage member 25 travels upon rollers 30. The carriage is adapted to support a seat as 35, and as indicated in Figure 2, a pair of such track assemblies may be employed, suitably spaced so that one may support each end of the seat.

Each roller is carried upon a shaft 31 extending through the side flanges of the inverted channel shaped carriage. The shafts are capable of limited vertical movement, being mounted in vertically elongated slots 32. Needle bearings as 33, or other suitable antifriction means, may be interposed between each roller and its shaft. The slotted portions of the side flanges of the carriage transfixed by the shafts 31 are angularly formed outwardly in the manner shown in Figure 3, to provide cam surfaces engageable by cam elements 34 of triangular cross section, one such cam element being carried upon the shaft on either side of the carriage.

The carriage is provided with inbent bottom flanges 36 which underhang the rail head to prevent separation of the carriage therefrom.

Each shaft is also headed at one end and threaded at the other for a nut 35, to retain the cams, and to enable drawing the cams together by tightening the nut. The force thus applied is resolved by the cam means into vertical pressure which forces the shaft 31 and the roller 30 carried thereby downwardly against the top of the track, and draws the flanges 26 upwardly against the under side of the rail head. The effect is thus to tighten the frictional engagement of all of the moving parts. A spring washer 37 resists rotation of the nut 35, maintaining adjustment, and also resilient engagement of the parts.

In the modification shown in Figures 4 and 5, a similar friction take-up action is secured with a somewhat different roller mounting, requiring no cams. The shaft 31A is mounted in downwardly projecting ears or arms 27A struck and extending angularly outwardly from the side flanges of the carriage 25A. The shaft is similarly headed at one end and threaded at the other to receive a nut 35A, which, when tightened, tends to draw the ears 27A together. Since they then swing about an approximate axis determined by their (horizontal) line of attachment to the remainder of the carriage, the ends of the ears move inwardly as well as downwardly when so drawn.

In Figures 6, 7 and 8 another modification is shown in which cam elements 34B are used, formed of stamped sheet metal and mounted, as in the first described embodiment, upon a shaft transfixing and vertically movable in the side webs of the carriage. Each cam has two inclined upper surfaces, one located on either side of the shaft 31B, each inclined surface cooperating with an out-turned ear 27B pressed from the body of the carriage and having a similarly inclined lower surface. The shaft is headed at one end, and at the other end provided with spring take-up means as 35B exerting a constant pull on the shaft and continuously and automatically taking up all clearance between track, carriage and rollers.

Another modification shown in Figures 9, 10 and 11 incorporates lug-like cam portions 27C angularly out-pressed from the flanges of the carriage member, one on either side of the roller shaft. The lug portions are attached at both ends, while the cam members 34C are somewhat box-shaped, carried as in the last described embodiment by the shaft 31C, and provided with appropriately inclined top surfaces interengageable with the cam portions 27C in such fashion that when the clamping nut 35C is tightened the shaft and roller are forced downwardly and the carriage forced upwardly with relation to the rail head.

While it will be apparent that the illustrated embodiments of the present invention herein disclosed are well calculated to adequately fulfill the objects and advantages primarily stated, it is to be understood that the invention is susceptible to variation, modification and change within the spirit and scope of the subjoined claims.

What I claim is:

1. In combination with an adjustable support comprising a longitudinally flanged track portion, a carriage portion movable thereover and having a retaining portion slidably interengageable with said flange to prevent separation of the carriage portion from the track portion, roller means carried by one of said portions and rollably engageable with the other thereof, journal means supporting the roller means in the portion by which it is carried, means reacting against said portion to actuate said journal means in a direction transverse to the line of movement of the carriage portion, including a pair of arms swingably carried by said portion, and adjustable means for moving said arms and for restraining movement thereof.

2. In combination with an adjustable support comprising a track portion, a carriage portion movable longitudinally thereover, roller means carried by one of said portions and rollably engageable with the other thereof, journal means supporting the roller means in the portion by which it is carried, means for moving said journal means in a direction transverse to the line of movement of the carriage portion to vary the engagement pressure between said portions and the roller means, said carriage portion including a pair of spaced longitudinally extending side webs, said track and carriage portions having overhanging portions preventing unwanted separation thereof, said journal means including a shaft extending through said webs and movable toward and from said track portion, said roller means being disposed upon said shaft between said webs, said means for moving the journal means including arms carried by the carriage portion and connected to the shaft and swingable toward and from the track portion.

3. In combination with an adjustable support comprising a track portion, a carriage portion movable longitudinally thereover, roller means carried by one of said portions and rollably engageable with the other thereof, journal means supporting the roller means in the portion by which it is carried, means for moving said journal means in a direction transverse to the line of movement of the carriage portion to vary the engagement pressure between said portions and the roller means, said carriage portion including a pair of spaced longitudinally extending side webs, said track and carriage portions having overhanging portions preventing unwanted separation thereof, said journal means including a shaft extending through said webs and movable toward and from said track portion, said roller means being disposed upon said shaft between said webs, said means for moving the journal means including arms carried by the carriage portion and connected to the shaft and swingable toward and from the track portion, and means also carried by the shaft and engageable with said arms to so move the same.

4. In combination with an adjustable support comprising a track portion, a carriage portion movable longitudinally thereover, roller means carried by one of said portions and rollably engageable with the other thereof, journal means supporting the roller means in the portion by which it is carried, means for moving said journal means in a direction transverse to the line of movement of the carriage portion to vary the engagement pressure between said portions and the roller means, said carriage portion including a pair of spaced longitudinally extending side webs, said track and carriage portions having overhanging portions preventing unwanted separation thereof, said journal means including a shaft extending through said webs and movable toward and from said track portion, said roller means being disposed upon said shaft between said webs, said means for moving the journal means including arms carried by the carriage portion and connected to the shaft and swingable toward and from the track portion, said shaft having a threaded portion, and abutment means cooperating with said threaded portion and reacting against said arms to move the same.

5. In combination with an adjustable support comprising a track portion, a carriage portion movable longitudinally thereover, roller means carried by one of said portions and rollably engageable with the other thereof, journal means supporting the roller means in the portion by which it is carried, means for moving said journal means in a direction transverse to the line of movement of the carriage portion to vary the engagement pressure between said portions and the roller means, said carriage portion including a pair of spaced longitudinally extending side webs, said track and carriage portions having overhanging portions preventing unwanted separation thereof, said journal means including a shaft extending through said webs and movable toward and from said carriage portions, said roller means being disposed upon said shaft between said webs, said means for moving the journal means including arms carried by and resiliently movable toward and from said side webs, the ends of said arms carrying said shaft and being movable toward and from the track portion during such swinging movement, and means also carried by the shaft for so moving said arms.

ALBERT J. RHODES.